United States Patent Office 3,482,984
Patented Dec. 9, 1969

3,482,984
PROCESS FOR PREPARING DEEP-FRIED
FOODSTUFFS
Nicholas G. Marotta, Milltown, Harvey Bell, North Plainfield, and Kenneth S. Ronai, Ridgewood, N.J., assignors to National Starch and Chemical Corporation, New York, N.Y., a corporation of Delaware
No Drawing. Filed June 10, 1966, Ser. No. 560,981
Int. Cl. A23l 1/00, 1/325
U.S. Cl. 99—1          3 Claims

ABSTRACT OF THE DISCLOSURE

Improved batter mix compositions based upon a cereal starch binder which has been oxidized by being sprayed with an aqueous sodium hypochlorite solution are applied to foodstuffs; the thus coated food is breaded and then cooked in hot oil.

---

This invention relates to improved batter mix compositions which are applied as coatings during the preparation of breaded, deep-friend foods, to a method for making such batter mix compositions, and to the foods coated therewith.

It is an object of this invention to provide a deep-fried batter mix material whose use results in a fried batter coating displaying a permanent degree of adhesion and cohesion which is far superior to that attainable with presently employed batter mixes. Another object of this invention is to provide a novel method of preparing such batter mix compositions. Other objects and advantages of this invention will be apparent from the following description thereof.

As is known in the art, deep-fried food batters, whether for use with fresh or frozen foods, ordinarily consist of various types of unconverted starches and/or flour along with such other optional ingredients as egg solids, corn meal, baking powder, cream of tartar, preservatives, seasonings, coloring matter and milk solids. These mixtures are then combined with water so as to obtain the desired coating viscosity whereupon they are applied to the food by means of a dip, spray or cascade technique. The batter coated food is then coated with a breading such as corn meal, cracker crumbs, bread crumbs, or the like After the excess breading is shaken free, the breaded foodstuff is then deep-fried by being immersed in a hot cooking oil such as corn oil, peanut oil or any other commonly employed food oil selected by the practitioner. Foods thus prepared may be immediately consumed or they may be packaged and quick frozen so that the ultimate consumer may prepare the foodstuff merely by reheating. In some cases, the food may not be cooked or it may receive only a partial cooking or "pre-frying" at this point, whereupon it is packaged and quick frozen with the frying of the uncooked or "pre-fried" frozen foodstuff then being completed by the ultimate consumer.

It has long been noted that most breaded batters, when prepared with the aforedescribed ingredients, display a relative lack of adhesion to their respective foodstuffs which is evidenced by their pronounced tendency to pull away from the foodstuff subsequent to the breading, deep-freezing and frying operations. The breaded batter actually forms a skin or coating having so little adhesion to the foodstuff that it may be literally stripped away from the surface of the foodstuff. This lack of adhesion is particularly evident when the foodstuff being coated is one of the pre-fried, quick frozen type and thus results in a certain deterioration as well as loss of coating upon being handled either prior to or after the final frying operation. In addition to this lack of adhesion, these deep-fried, breaded batter coatings display very poor cohesion which, in turn, results in their poor film strength as evidenced by the ready crumbling and disintegration of the breaded batter coating when it is handled or eaten. This lack of cohesion on the part of the breaded foodstuff detracts from its overall appeal to the consumer.

As is known to those in the art, amylaceous materials, such as starches, may be dissolved or dispersed in a solvent, usually water, and treated with an oxidizing agent to provide starch products having modified chemical and physical properties. Although oxidized starch products produced by such aqueous oxidation techniques have been used to prepare batter mixes for breaded, deep-fried foods, it has been found that these mixes still exhibit all of the detrimental characteristics, heretofore described, of the other mixes previously employed for this purpose. Furthermore, oxidized starches prepared by means of a dry oxidation process, wherein oxidizing gases are passed over the starch, provide satisfactory adhesion only when they are freshly prepared while exhibiting a substantial loss of effectiveness upon storage for even short periods of time.

We have now discovered that the use of oxidized starch products which have been prepared by means of a procedure wherein an oxidizing agent is sprayed onto the starch provides an improved deep-fried food batter which is entirely free from the undesirable properties associated with the heretofore employed mixes.

The starch bases which may be used in the novel process of this invention comprise cereal starches selected from the group consisting of corn, wheat and rice starches. Also included are the conversion products derived from any of the latter bases including, for example, dextrines prepared by the hydrolytic action of acids and/or heat; and, fluidity or thin boiling starches prepared by enzyme conversion or by mild acid hydrolysis. In addition, any substituted ether or ester derivative of these cereal starches may be employed. It should also be noted that starch containing cereal flours derived from the above sources are, for the purposes of this invention, fully equivalent to starches.

We have found that the use of aqueous slurries of starches resulting from a spray oxidation procedure and having a sediment volume, as hereinafter defined, falling within the range of from about 38 to 50, provides a batter mix for breaded, deep-fried foods which is, surprisingly, vastly superior in all respects to batter mixes prepared from ordinary starches or flours. Thus, the batter mix compositions of our invention display a degree of adhesion to deep-fried foods which is so tenacious as to actually render the breaded batter coating into an integral component of the foodstuff. This adhesion is, in fact, so complete that it is virtually impossible to remove the deep-fried, breaded batter from the foodstuff without actually pulling off a portion of the foodstuff along with the breaded batter. Moreover, the batter mix of our invention possesses a highly cohesive film strength which is resistant to the high temperature of the deep-frying operation. This unusual cohesiveness on the part of the breaded batters prepared with our oxidized starch batter mixes, allows these deep-fried foodstuffs to retain their breaded batter mix coatings as a continuous entity which is completely free from any undesirable crumbling or disintegration.

The cohesive, continuous nature of these breaded coatings traps and maintains the moisture content of the foodstuff during the deep-frying operations resulting in a final product which is desirably moist, tender and fresh tasting. In contrast, ordinary starch and flour batters, as well as those containing oxidized starches prepared by immersion in an aqueous medium, are low in cohesive strength and are thus degraded by the heat of the deep-frying operation so that the moisture content of the foodstuff is lost while, at the same time, the lack of adhesion beween the batter and the foodstuff is also contributing to the moisture loss.

In preparing the oxidized starch products which are to be used in the novel process of this invention, one may merely spray the selected dry starch base with an aqueous solution containing from about 1 to 10%, by weight, of sodium hypochlorite. Any conventional spraying apparatus may be utilized in this spraying procedure, the practitioner thereby being able to employ the spraying means best suited to his particular needs in light of the equipment which is available. It is preferable, though not essential, that a rather fine spray be used in order to obtain uniform distribution of the oxidizing solution as well as to avoid the formation of lumps and grits. An additional grinding operation subsequent to the spraying step will, however, correct the latter situation. In all instances, the oxidized starch product resulting from this procedure is still in an essentially dry form and is, therefore, readily available for immediate use in the batter mixes of this invention.

With regard to the level of treatment utilized in this novel procedure, sufficient oxidizing solution is sprayed onto the starch in order to insure that from about 0.06 to 0.8% of sodium hypochlorite, as based on the dry weight of starch, is available for reaction with the starch. When reference is made herein to the "dry" weight of the starch, it is meant to refer to commercially prepared starch which has a water content of from 7 to 14%, by weight. Levels of addition which either do not meet the cited range or which exceed it adversely affect the resulting adhesion properties of the batter mix.

It should be noted that the practitioner is not limited to the use of ground or pulverized starch bases in the spraying operation. Thus, the solution of oxidizing agent may be sprayed onto a starch filter cake such as is obtained during the commercial preparation of starch by means of the wet-milling process. The eventual grinding of the sprayed filter cake thus provides oxidized starch products which are, in all respects, similar to those prepared by spraying powdered starch.

In addition to characterizing the resulting oxidized starch products by means of the concentration of oxidizing agent with which they have been treated, they may also be characterized by their sediment volume. The latter term relates to a measure of the rate in which a starch will settle out of an aqueous slurry. As used herein, the term sediment volume is defined as the volume of sediment, on a percentage basis, which settles out after 18 hours from a 20.45%, by weight, aqueous suspension of the starch being tested. As previously noted, the oxidized starch products applicable to the process of this invention should have a sediment volume in the range of from about 38 to 50. The precise technique for determining sediment volume will be described in a subsequent portion of this disclosure.

In the actual preparation of our batter mixes, the practitioner need merely prepare an aqueous slurry containing about 60 to 100 parts, by weight, of oxidized starch per 100 parts of water. The precise starch: water ratio will depend, of course, upon the type of foodstuff being prepared, the manner in which the batter mix is to be applied, and the particular starch being utilized. The starch slurry is then kept under agitation prior to its application to the foodstuff so as to prevent the starch from settling. The batter mix may thereupon be applied to the foodstuff, which may be either fresh or frozen, by any convenient procedure such as dipping, spraying or cascading. After draining off the excess batter, the breading is applied and the foodstuff may then be deep-fried. It should be noted that it is unnecessary to heat the starch slurry prior to its application to the foodstuff. The practitioner may add such seasoning, seasoning extenders, preservatives, or food colors to the batter mix slurry as are desired, although, in most cases, such additives are not needed. The resulting breaded, deep-fried foodstuffs made with our batter mix are, in all cases, characterized by the golden-brown color and smooth, even texture of their breaded coatings which are always notably free from any crumbling or disintegration during their subsequent handling and eating.

In an alternative method, our batter mix starches may be applied to foodstuffs by means of a dusting procedure wherein the dry oxidized starch is directly applied to the surface of the foodstuff. The breading may also be applied by dusting and the foodstuff may then be deep-fried.

Our starch batter mix compositions may be prepared and used in the aforedescribed manner by manufacturers of deep-fried, frozen food products as well as by restaurants and housewives who may utilize it for the point-of-use deep-frying of all fresh and frozen foodstuffs. The starch batter mix compositions of our invention may thus be used in the preparation of all types of deep-fried fresh and frozen foodstuffs including fish, shell fish, poultry, meat and vegetable products including fish sticks, fish fillets, fish steaks, whole fish, scallops, oysters, clams, shrimps, lobster parts, chicken and turkey parts, veal, beef, pork, eggplant, and onion rings.

The following examples will further illustrate the embodiment of our invention. In these examples all parts given are by weight unless otherwise indicated.

EXAMPLE I

This example illustrates the use of our novel starch batter mix in the preparation of pre-fried frozen fish which require further cooking prior to their ultimate consumption.

Frozen, raw, skinless codfish fillets were cut into 3" x 2" x ½" portions and dipped in an aqueous batter mix slurry which was being maintained, under agitation, at 70° F. and which comprised a mixture of 110 parts of water and 100 parts of corn starch which had been sprayed with 2 parts of a 6%, by weight, aqueous sodium hypochlorite solution, thus providing an 0.12% oxidation treatment, as based on the dry weight of the starch. This resulting oxidized starch product had a sediment volume of 41 ml.

In determining the sediment volume of this starch sample, as well as for all of the other starches described in subsequent examples, the procedure employed comprised placing from 10-15 ml. of distilled water into a 100 ml. graduate cylinder. To this water there was then added 25 grams of the starch sample whose weight had been corrected for a moisture content of 10% by weight. The resulting mixture was agitated whereupon additional water was added so as to bring the total volume to 100 ml. After additional agitation the cylinder was allowed to stand at a temperature of 72° F. After 18 hours the sediment volume was determined by reading off the level to which the starch particles had settled.

After the dipping of the fish, the excess batter mix was drained off. The fish portions were then thoroughly coated with a bread crumb breading, lightly patted and divided into two series. The breaded fish portions of the first series were placed into a wire mesh frying basket, immersed in corn oil which was at a temperature of 385° F. and then pre-fried for 45 seconds whereupon they were removed from the hot oil and allowed to drain. The pre-fried fish portions were then cooled in a refrigerator at approximately 40° F. for a period of one hour and were thereupon refrozen at 0° F. Samples of the frozen, pre-fried codfish which had been stored for 7 days at 0° F. were then prepared for consumption by being baked for 18 minutes in an oven set at a temperature of 350° F. Additional samples were also prepared by baking for 11 minutes at a temperature of 450° F.

The second series was placed directly into a freezer which was maintained at a temperature of 0° F. and retained therein for a period of 7 days. These frozen, breaded fish portions were then prepared for consumption by being deep-fat fried at an oil temperature of 365° F. for a period of 3 minutes.

Both sets of the ready-to-eat samples were evaluated for general appearance and, more particularly, for the adhesion and cohesion characteristics of the breaded coatings. In all cases it was observed that the breaded coatings displayed a firm, pleasing texture along with a uniform, golden-brown color. Moreover, they possessed an outstanding degree of adhesion to the fish so that removal of the breading could be accomplished only by removing a part of the fish. As for their cohesive properties, it was noted that these fish could be handled and eaten without any crumbling or disintegration on the part of the breaded coatings.

In order to quantitatively determine the adhesion properties of the resulting product, a fried portion of the thus prepared fish was sliced lengthwise and then scraped with a knife in an attempt to remove the fish from the bread coating. The breaded coating was then examined for the purpose of determining the area of the coating whereon particles of fish were still adhered relative to the total area of the breaded coating. This result was then expressed as percent adhesion. In interpreting these results, 0-30% may be viewed as poor adhesion; 50 to 70% as fair adhesion; and, 80 to 100% as excellent adhesion.

When the above prepared fish portions were subjected to the latter test procedure, they showed an adhesion value of 90-100% thereby further indicating the excellent adhesion obtained with the novel batter mixes of this invention.

In contrast, unsatisfactory results were obtained when the above described procedures were repeated using, in this instance, an ordinary batter mix comprising 3.5 parts of water and 1.5 parts of a mixture containing 72.2% wheat flour, 18% non-fat milk solids, 2.5% dry egg white, 7% salt and 0.3% pepper. Thus, although the resulting breaded coatings possessed a firm texture, they displayed very poor adhesion to the fish and could be stripped away with very little effort as is indicated by the fact that they had an adhesion value of only 25%. Moreover, their cohesion was entirely negligible as was evidenced by their ready crumbling and disintegration upon handling and eating.

The latter results serve to point out the distinct superiority of our oxidized starch batter mixes with respect to their cohesive strength and their adhesion to foodstuffs.

EXAMPLE II

This example illustrates the use of a number of different starch batter mixes in the preparation of various breaded foodstuffs.

Utilizing the preparative techniques and evaluation procedures set forth in Example I, hereinabove, batter mixes were prepared utilizing different starch bases and a variety of levels of oxidation treatment. These mixes were then used in the coating of a variety of foodstuffs.

The corresponding data is presented in the following table:

| Starch Base | Percent NaOCl treatment, on 100 parts of starch | Sediment Volume (ml.) | Food Product | Percent Adhesion |
|---|---|---|---|---|
| Corn | 0.06 | 38 | Codfish | 70-80 |
|  | 0.18 | 44 | Veal cutlets | 80-100 |
| Rice | 0.12 | 40 | Haddock | 70 |
| Wheat | 0.20 | 48 | Beef patties | 90 |
| Corn starch which had been acid converted with HCl to a degree known, in the trade, as 20 fluidity. | 0.30 | 50 | Chicken breasts | 70 |

The data summarized above clearly indicates the effectiveness of the batter mixes of this invention with regard to the adhesion displayed on the part of the resulting breaded coatings.

EXAMPLE III

This examples illustrates the necessity for using only those oxidized starch products which have been prepared as herein specified in order to obtain completely satisfactory batter mixes.

Thus, comparisons were run with regard to the various starch bases, the levels of oxidation treatment, and the oxidizing agents which were used to prepare the starch components of our novel batter mixes. The resulting data is presented in the following table. The procedures of Example I were used wherever applicable.

| Starch Base | Percent Oxidation Treatment, on 100 parts of starch | Oxidizing Agent | Sediment Volume (ml.) | Percent Adhesion |
|---|---|---|---|---|
| Corn | 0.00 | | 35 | 10-30 |
|  | 0.06 | NaOCl | 38 | 70-80 |
|  | 0.80 | NaOCl | 50 | 70-90 |
|  | 1.20 | NaOCl | 56 | 10-20 |
|  | 0.60 | $H_2O_2$ | 36 | 0-10 |
| Potato | 0.20 | NaOCl | 50 | 40 |
| Rice | 0.00 | | 34 | 30-35 |
|  | 0.12 | NaOCl | 40 | 70 |
|  | 0.60 | $H_2O_2$ | 35 | 0-10 |

The data presented above clearly indicates the necessity for adhering to the previously specified process limitations in order to obtain oxidized starch products which exhibit the optimum properties required for their use in our novel batter mixes for breaded, deep-fried foods.

EXAMPLE IV

This example compares the effectiveness of the oxidized starches prepared by the novel process of this invention with that of a conventionally prepared oxidized starch when utilized in batter mixes for breaded, deep-fried foodstuffs.

Thus, the oxidized starch prepared in Example I, hereinabove, was compared with an oxidized starch which had been prepared by treating a 30%, by weight, aqueous corn starch suspension with a 6%, by weight, aqueous sodium hypochlorite solution, thereupon neutralizing the resulting slurry and finally filtering, washing and drying the resulting oxidized starch product.

The procedures followed, in each case, as regards the preparation and application of the batter mix to the fish portions and their subsequent breading, pre-frying, freezing, baking and evaluation, were identical in all respects with the descriptions provided in Example I except of course, with regard to the specific oxidized starch which was utilized in the preparation of the final batter mix.

Thus, it was found that the system utilizing the batter mix containing the oxidized starch prepared by means of the procedure specified for use in the process of this invention showed an adhesion value of 90–100%, whereas the system which contained the conveniently oxidized starch therein displayed an adhesion value of only 20–30%. This data thus indicates the unique results obtained upon utilizing the particular preparative process specified for use in the manufacture of the starch products applicable for use in the process of this invention.

Summarizing, our invention provides vastly improved batter mix compositions for use in the preparation of breaded, deep-fried foods. Variations may be made in proportions, procedures, and materials without departing from the scope of this invention which is defined by the following claims.

We claim:

1. The process of preparing a breaded, deep-fried foodstuff which comprises spraying a dry mass of cereal starch with an aqueous solution of sodium hypochlorite sufficient to produce a dry, oxidized cereal starch, said oxidized cereal starch having a sediment volume in the range of from about 38 to 50; applying an aqueous slurry of said oxidized cereal starch to a foodstuff; applying a suitable breading to the thus coated foodstuff; and, then cooking the thus breaded, batter mix coated foodstuff in a hot cooking oil.

2. The process of claim 1, wherein said cereal starch is treated with about 0.06 to 0.80% of sodium hypochlorite, as based on the dry weight of the cereal starch.

3. The process of claim 1, wherein said oxidized cereal starch is applied to said foodstuff in dry form.

References Cited

UNITED STATES PATENTS

| | | | |
|---|---|---|---|
| 2,204,615 | 6/1940 | Nivling | 127—33 |
| 2,221,552 | 11/1940 | Nicolson | 127—33 |
| 3,052,545 | 9/1962 | Ducharme | 99—1 |
| 3,208,851 | 9/1965 | Antinori et al. | 99—1 |

RAYMOND N. JONES, Primary Examiner

U.S. Cl. X.R.

99—111